(12) United States Patent
Holman et al.

(10) Patent No.: US 12,422,068 B2
(45) Date of Patent: Sep. 23, 2025

(54) COMPOSITE PIPE END-FITTING

(71) Applicant: MAGMA GLOBAL LIMITED, Portsmouth (GB)

(72) Inventors: Daniel Clement Holman, Southampton (GB); Fred William Merchant, Portchester (GB)

(73) Assignee: MAGMA GLOBAL LIMITED (GB)

( * ) Notice: Subject to any disclaimer, the term of this patent is extended or adjusted under 35 U.S.C. 154(b) by 0 days.

(21) Appl. No.: 18/294,967

(22) PCT Filed: Jul. 21, 2022

(86) PCT No.: PCT/GB2022/051893
§ 371 (c)(1),
(2) Date: Feb. 2, 2024

(87) PCT Pub. No.: WO2023/012450
PCT Pub. Date: Feb. 9, 2023

(65) Prior Publication Data
US 2025/0020249 A1    Jan. 16, 2025

(30) Foreign Application Priority Data
Aug. 4, 2021 (GB) ..................... 2111284

(51) Int. Cl.
*F16L 23/028* (2006.01)
*F16L 19/02* (2006.01)
*F16L 47/14* (2006.01)

(52) U.S. Cl.
CPC ....... *F16L 23/0286* (2013.01); *F16L 19/0206* (2013.01); *F16L 47/14* (2013.01)

(58) Field of Classification Search
CPC .... F16L 23/0286; F16L 19/0206; F16L 47/14
See application file for complete search history.

(56) References Cited

U.S. PATENT DOCUMENTS 4,619,470 A * 10/1986 Overath ................. F16L 47/14
4,702,498 A * 10/1987 Mueller ................. F16L 47/14
(Continued)

FOREIGN PATENT DOCUMENTS

DE    1869218 U    3/1963
EP    2492571 A2    8/2012
(Continued)

OTHER PUBLICATIONS

International Search Report mailed Nov. 24, 2022 in corresponding PCT International Application No. PCT/GB2022/051893.
(Continued)

*Primary Examiner* — Zachary T Dragicevich
(74) *Attorney, Agent, or Firm* — OSTROLENK FABER LLP (57) ABSTRACT

A composite pipe termination is provided comprising: a) a composite pipe having an interior pipe surface, an exterior pipe surface, a pipe end and a liner; b) a composite annular portion attached to the exterior pipe surface, the external surface of the annular portion comprising circumferentially extending ridges; c) a collet having an interior collet surface, wherein the collet encloses at least a part of the annular portion and wherein the interior collet surface comprises circumferentially extending grooves, and wherein circumferentially extending ridges on the external surface of the annular portion mesh with circumferentially extending grooves on the interior collet surface to provide axial movement blocking means; d) an annular collar which encloses and mates with the collet to prevent the collet from moving axially relative to the annular collar; e) an end-fitting locked to the annular collar.

20 Claims, 4 Drawing Sheets

(56) References Cited

U.S. PATENT DOCUMENTS

| | | | |
|---|---|---|---|
| 6,902,205 B2* | 6/2005 | Bouey | F16L 33/224 |
| 2009/0085351 A1 | 4/2009 | Cloos et al. | |
| 2014/0312612 A1 | 10/2014 | Dhagat et al. | |
| 2015/0048611 A1 | 2/2015 | Shanks, II et al. | |
| 2020/0158267 A1* | 5/2020 | Charlesworth | F16L 47/14 |
| 2020/0378537 A1* | 12/2020 | Firmian | F16L 47/14 |

FOREIGN PATENT DOCUMENTS

| | | |
|---|---|---|
| EP | 3040593 A1 | 7/2016 |
| FR | 2095625 A5 | 1/1972 |
| FR | 2238886 A1 | 2/1975 |
| GB | 1453346 A | 10/1976 |
| GB | 2439146 A | 12/2007 |
| WO | WO 2017/163021 A1 | 9/2017 |
| WO | WO 2021-102329 A1 | 5/2021 |

OTHER PUBLICATIONS

Written Opinion mailed Nov. 24, 2022 in corresponding PCT International Application No. PCT/GB2022/051893.

\* cited by examiner

COMPOSITE PIPE END-FITTING

FIELD OF THE INVENTION

The invention relates to a composite pipe termination for use in the oil and gas industry, such as in subterranean and sub-sea locations, and a method of providing a composite pipe termination.

DESCRIPTION OF THE RELATED ART

Subsea oil and gas drilling and development employs pipes to transport liquid and/or gaseous hydrocarbons from the seabed to the sea surface and to transport injection fluids from the surface to the seabed. These pipes have typically been made from steel or from unbonded layers of materials, such as one or more layer(s) of steel wires combined with a plastic liner, which together form a flexible, unbonded steel pipe. Such unbonded, flexible pipes are covered by American Petroleum Institute standard API 17J.

Over time, the subsea depths at which hydrocarbons are extracted has tended to increase. This development has been accompanied by a need to operate under harsher conditions including one or more of conditions of increased salinity, higher acidity, higher internal and external pressures and higher temperatures. In order to address these challenges, the industry has turned to composite pipes, comprising fibre-reinforced thermoplastic polymer. Reference may be made to WO 2012/072993 A1 which discloses such composite pipes. These pipes may be manufactured by winding tapes of composite material onto a pipe liner and fusing them thereto, then winding further layers of tape on top and fusing each layer to the immediately preceding layer. The composite material typically comprises a thermoplastic matrix, such as polyether ether ketone, with fibres embedded therein and the liner is typically made of the same thermoplastic material as the matrix. These pipes are lighter and better able to withstand the more severe environments as well as the more complex dynamic loading conditions including tension, bending and internal/external pressure found deep below the sea surface. DNV standard DNVGL-ST-F119 (August 2018) relates to thermoplastic composite pipes for offshore applications in the oil and gas industry.

An obstacle to the introduction of such composite pipes has been the ability to effectively terminate such pipes and to reliably connect them to non-composite, especially steel, piping and apparatus at both subsea and surface interfaces. Composite pipe terminations and connections must be able to provide a reliable transition from the composite pipe material to a standard steel pipe, which may typically incorporate a steel flange or hub connection. The different structural properties of the two materials on the one hand and the differences in thermal expansion on the other, may make it challenging to effect both a reliable structural and sealing connection. Reference may also be made to WO 2012/095633 A1 and WO 2017/163021 A1, which disclose prior art end-fittings for a composite pipe.

There is a need to improve composite pipe terminations, such that they may reliably be connected to metal piping. In particular, there is a need to improve the seal achieved by the composite pipe termination and to improve its ability to resist axial and torsional forces. In addition, it is desirable for the diameter of the pipe termination to be kept small so that it is not significantly larger than the diameter of the pipe.

For completeness, pipe end-fittings are also known from GB 2 439 146 A, EP 2 492 571 A2 and US 2014/0312612 A1. These documents relate to flexible steel, unbonded pipe of the type discussed above. Although such flexible pipes may comprise multiple layers including steel and polymer layers, the pipes are, at heart, steel pipes and not composite pipes as presently defined. As a result of these pipes being fundamentally steel pipes, the problems of providing an end-fitting to a composite pipe do not arise. The end-fitting generally comprises a steel flange, which is attached to the underlying steel carcass of the flexible steel, unbonded pipe. This is a metal-to-metal connection, so the challenges which may arise when attaching a steel end-fitting to a composite pipe do not occur.

It is against this background that the present invention has been devised.

SUMMARY OF THE INVENTION

According to a first aspect of the invention, a composite pipe termination is provided, comprising:
a) a composite pipe formed of composite material and having an interior pipe surface, an exterior pipe surface and a pipe end, wherein composite material is a material comprising a polymer matrix and a plurality of reinforcing fibres embedded in the polymer matrix;
b) a liner, wherein the interior pipe surface is fused to the liner;
c) an annular portion of composite material having an internal surface attached to the exterior pipe surface and an external surface, wherein the external surface comprises circumferentially extending ridges;
d) a collet having an interior collet surface, wherein the collet encloses at least a part of the annular portion and wherein the interior collet surface comprises circumferentially extending grooves, and wherein circumferentially extending ridges on the external surface of the annular portion mesh with circumferentially extending grooves on the interior collet surface to provide axial movement blocking means which prevent or limit axial movement of the collet relative to the annular portion;
e) an annular collar which encloses and mates with the collet to prevent the collet from moving axially relative to the annular collar;
f) an end-fitting;
locking means which lock the end-fitting to the annular collar to prevent the end-fitting from moving axially with respect to the annular collar.

As used herein, the term "end-fitting" means a device intended to attach to another apparatus, such as a pipe, or an end cap, and may comprise a flange, hub or the like.

As used herein, the term "axial" refers to the axis of the composite pipe, which extends longitudinally along the composite pipe.

The first aspect of the invention employs circumferentially extending ridges on the external surface of the annular portion which mesh with at least some of the circumferentially extending grooves on the interior collet surface to prevent or limit axial movement of the collet relative to the annular portion.

According to the first aspect of the invention, it is not necessary for all of the circumferentially extending ridges on the external surface of the annular portion to mesh with all of the circumferentially extending grooves on the interior collet surface and indeed it may be advantageous if not all of the ridges mesh with all of the grooves in the product as manufactured. Circumferentially extending ridges on the external surface of the annular portion may, for example, be slightly offset axially in relation to corresponding circumferentially extending grooves on the interior collet surface.

This is because, in use, the pipe termination may be subject to expansion as a result of the high internal pressure of the transported fluid, and as a result of the high temperature of that fluid (thermal expansion). Having an arrangement in which some circumferentially extending ridges on the external surface of the annular portion do not exactly mesh with some of the circumferentially extending grooves on the interior collet surface, may allow the stresses which occur in use to be smoothed out as the pipe expands. In the expanded, in-use state, it is typically the case that each circumferentially extending ridge on the external surface of the annular portion meshes with a circumferentially extending groove on the interior collet surface to prevent axial movement of the collet relative to the annular portion, notwithstanding the fact that, prior to use, not all ridges may mesh with a groove, which may allow limited axial movement.

According to one embodiment of the first aspect, the collet is divided axially into two or more parts to enable it to be assembled over the circumferentially extending ridges on the external surface of the annular portion. This is because the ridges and grooves extend circumferentially, so do not form a threaded connection which would allow the collet to be threaded onto the annular portion.

According to another embodiment of the first aspect, the circumferentially extending ridges on the external surface of the annular portion and the circumferentially extending grooves on the interior collet surface have a wave-form which is selected from triangular and sinusoidal. If triangular, then a saw-tooth type wave-form may be provided and, in this case, the apexes of the triangles may be rounded.

According to a further embodiment of the first aspect, the annular portion comprises an extension region which extends beyond the pipe end.

According to another embodiment of the first aspect, the liner comprises an extension portion which extends beyond the pipe end.

According to one embodiment of the first aspect, a first sealing element provides a seal between the collet, the extension region and the collar and a second sealing element provides a seal between the extension region, the pipe end and the extension portion, wherein the first sealing element, the extension region, the second sealing element and the extension portion together form a sealing interface which sealingly engages with the end fitting.

The first and second sealing elements may consist of thermoplastic polymer. The first and second sealing elements may comprise or may consist of polyether ether ketone (PEEK).

According to another embodiment of the first aspect, the end-fitting comprises:
a. a first interface which sealingly engages with the sealing interface:
b. a second interface for sealingly engaging with another apparatus;
c. an intermediate region which connects the first interface to the second interface, wherein the intermediate region has a diameter which is smaller than the diameter of the first interface.

According to one alternative:
a. The annular collar comprises a locking portion which extends beyond the first interface;
b. the locking portion comprises an inner surface which is provided with a female thread;
c. the end-fitting comprises an outer surface which is provided with a male thread;
d. the male thread on the outer surface of the end-fitting engages with the female thread of the locking portion to lock the end-fitting to the annular collar and prevent the end-fitting from moving axially with respect to the annular collar.

According to another alternative:
a. The annular collar comprises a locking portion which extends beyond the first interface, such that the locking portion overlaps part of the intermediate region and is radially spaced therefrom by an annular locking space;
b. the locking portion comprises an inner surface which is provided with a female thread;
c. the locking means comprises a locking ring having an external surface provided with a male thread, and
d. the male thread of the locking ring engages with the female thread of the locking portion to lock the locking ring within the annular locking space and prevent the end-fitting from moving axially with respect to the annular collar.

According to a further embodiment of the first aspect, first interface comprises a receiving portion formed to receive part of the extension portion and form a lip seal, wherein, in use, the lip seal is pressed against the receiving portion by the pressure of fluid contained within the pipe termination to enhance the seal.

According to one embodiment of the first aspect, the end-fitting, the collet, the collar and the locking ring are made of metal and preferably of steel.

According to another embodiment of the first aspect, the end-fitting comprises a flange.

According to a further embodiment of the first aspect, the polymer matrix comprises and may consist of thermoplastic polymer. The polymer matrix may consist of PEEK.

According to one embodiment of the first aspect, the reinforcing fibres comprise glass fibres, carbon fibres, or mixtures thereof.

According to another embodiment of the first aspect, the composite pipe comprises wound tapes of composite material which have been fused together and wherein the polymer matrix consists of thermoplastic polymer. According to this embodiment, the reinforcing fibres may be continuous (that is unbroken) along the entire length of the tapes.

According to a further embodiment of the first aspect, the liner comprises and may consist of thermoplastic polymer. The liner may consist of PEEK.

According to one embodiment of the first aspect, the annular portion consists of a composite material which is the same as the composite material of which the composite pipe consists.

According to a second aspect of the invention, a method of providing a composite pipe termination is provided, the method comprising:
a) providing a composite pipe formed of composite material and having an interior pipe surface, an exterior pipe surface and a pipe end, wherein composite material is a material comprising a polymer matrix and a plurality of reinforcing fibres embedded in the polymer matrix; and wherein the interior pipe surface is fused to a liner:
b) attaching an annular portion of composite material to the exterior pipe surface, wherein the annular portion has an external surface;
c) providing the external surface of the annular portion with circumferentially extending ridges;
d) providing a collet having an interior collet surface, wherein the interior collet surface comprises circumferentially extending grooves and wherein the collet is divided axially into two or more parts to enable it to be assembled over the circumferentially extending ridges on the external surface of the annular portion;

e) assembling the collet to enclose at least a portion of the annular portion, such that circumferentially extending ridges on the external surface of the annular portion mesh with circumferentially extending grooves on the interior collet surface to provide axial movement blocking means which prevent or limit axial movement of the collet relative to the annular portion;
f) providing:
  i. an annular collar configured to enclose and mate with the collet;
  ii. an end-fitting;
  iii. locking means which lock the end-fitting to the annular collar:
g) arranging the annular collar to enclose and mate with the collet to prevent the collet from moving axially relative to the annular collar and locking the end-fitting to the annular collar with the locking means in order to prevent the end-fitting from moving axially with respect to the annular collar.

According to one embodiment of the second aspect, b) comprises winding tapes of composite material onto the exterior pipe surface to create the annular portion.

According to another embodiment of the second aspect, c) comprises removing a portion of the wound tapes to provide the circumferentially extending ridges.

BRIEF DESCRIPTION OF THE DRAWINGS

The invention will now be further described, by way of example only, and with reference to the accompanying drawings, in which.

DETAILED DESCRIPTION

A detailed description of the invention will now be provided with reference to the above figures. A given reference number is always used to denote the same feature in each of the accompanying drawings.

Figure 1:
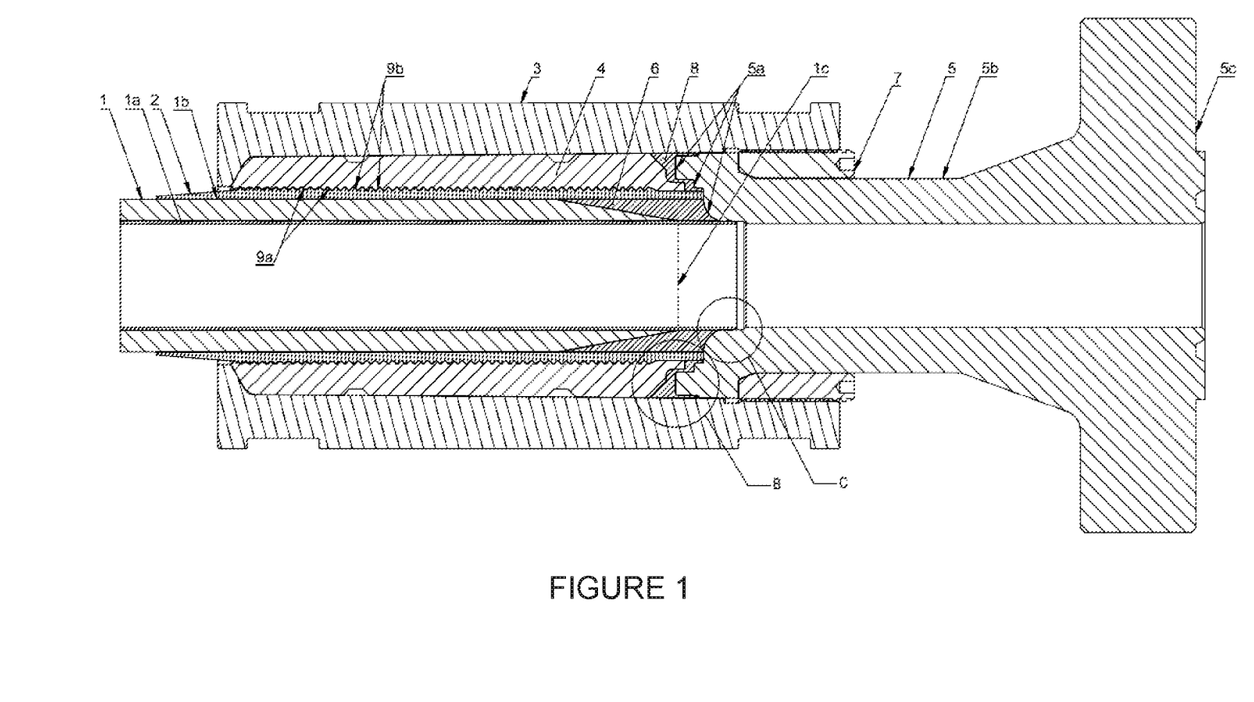
FIG. 1 shows a side-elevation of a composite pipe termination according to a first embodiment of the invention.

FIG. 1 shows a side-elevation of a composite pipe termination according to an embodiment of the invention. Specifically, it shows a composite pipe 1 having an interior pipe surface 1a, an exterior pipe surface 1b and a pipe end 1c. A liner (shown in more detail in FIG. 3) is fused to the interior pipe surface.

Typically, the composite pipe consists of wound tapes of composite material which have been fused together. The composite material typically consists of a PEEK matrix and a plurality of carbon fibres embedded therein. The tapes are typically wound onto a PEEK liner.

The pipe 1 comprises an annular portion 2 having an internal surface attached to the exterior pipe surface 1b. The annular portion also comprises composite material. Typically, the annular portion is also manufactured by winding consecutive layers of tapes of composite material, each layer being fused to the preceding one. The composite material typically consists of a PEEK matrix and a plurality of continuous carbon fibres embedded therein.

The annular portion has an external surface comprising circumferentially extending ridges 9a. In this embodiment, the circumferentially extending ridges 9a are provided along a portion of the external surface. Circumferentially extending ridges 9a are typically machined into the annular portion.

A collet 4 is provided which encloses at least a part of the annular portion 2. Collet 4 has an interior collet surface comprising circumferentially extending grooves 9b. The circumferentially extending ridges on the external surface of the annular portion 9a mesh with circumferentially extending grooves 9b on the interior collet surface to provide axial movement blocking means which prevent or limit axial movement of the collet 4 relative to the annular portion 2. Collet 4 is typically made of metal, preferably of steel.

The ridges 9a and grooves 9b prevent the collet from being assembled by sliding it into place, so the collet is typically divided axially into two or more parts to enable it to be assembled over the circumferentially extending ridges 9a on the external surface of the annular portion 2. Typically, the collet is divided into three parts.

The composite pipe termination is provided with an annular collar 3 which encloses and mates with the collet 4 to prevent the collet 4 from moving axially relative to the annular collar 4. Annular collar 3 is typically made of metal, preferably of steel.

As shown in FIG. 1, the annular portion 2 comprises an extension region which extends beyond the pipe end 1c. Moreover, the liner comprises an extension portion which extends beyond the pipe end (the extension portion is shown in more detail in FIG. 3).

As also shown in FIG. 1, a first sealing element 8 is provided to form a seal between the collet, the extension region and the collar and a second sealing element (6) provides a seal between the extension region, the pipe end and the extension portion. The first sealing element, the extension region, the second sealing element and the extension portion together form a sealing interface which sealingly engages with the end fitting 5. Typically, the first and second sealing elements consist of PEEK.

The end fitting 5 comprises a first interface 5a which sealingly engages with the sealing interface, a second interface 5c for sealingly engaging with another apparatus, such as a pipe, or an end cap, and may comprise a flange, hub or the like, and an intermediate region 5b which connects the first interface to the second interface. As can be seen from FIG. 1, the intermediate region 5b of this embodiment has a diameter which is smaller than the diameter of the first interface 5a. The end-fitting 5 is typically made of metal, preferably of steel.

Figure 4:
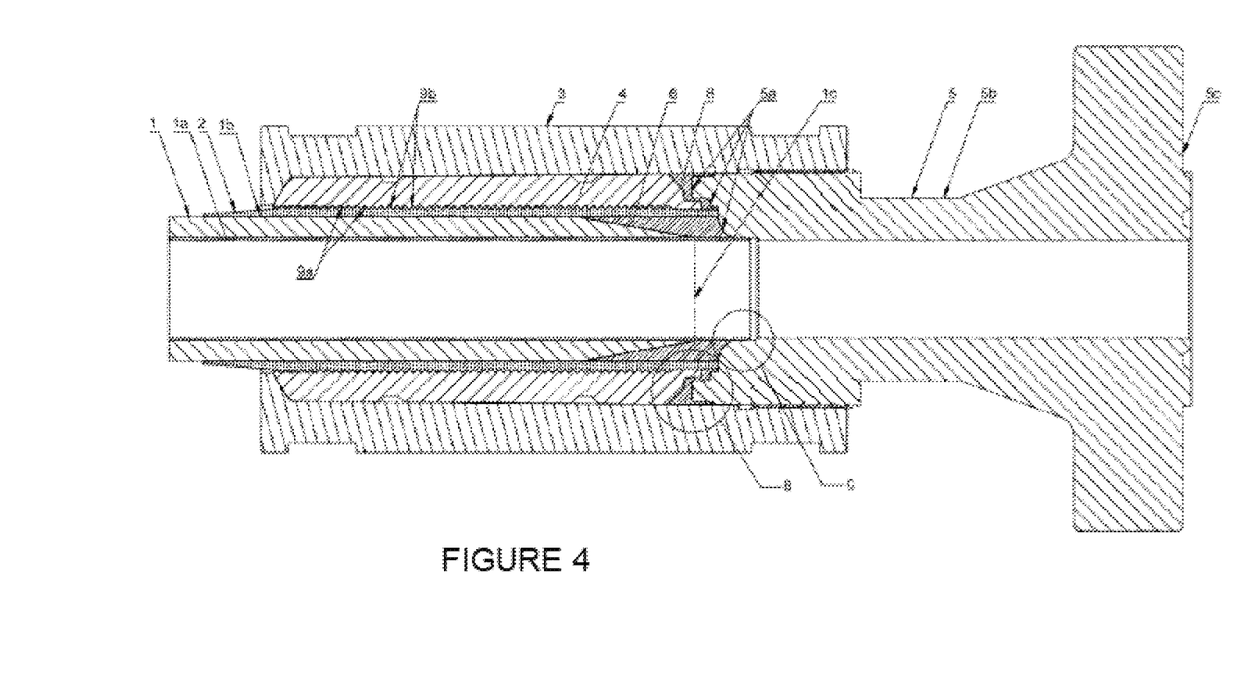
FIG. 4 shows a side-elevation view of a composite pipe termination according to a second embodiment of the invention.

As can be seen from FIG. 1, in this embodiment, the annular collar 3 comprises a locking portion which extends beyond the first interface 5a to overlap part of the intermediate region 5b. It is radially spaced from the intermediate region by an annular locking space. The locking portion comprises an inner surface which is provided with a female thread and locking means comprising locking ring 7 are also provided. The locking ring 7 has an external surface provided with a male thread, such that the male thread of the locking ring 7 engages with the female thread of the locking portion to lock the locking ring 7 within the annular locking space and prevent the end-fitting from moving axially with respect to the annular collar. Alternatively, as shown in FIG. 4, it may be desirable to lock end-fitting 5 directly to the annular collar 3 by means of a threaded connection between the two.

Figure 2:
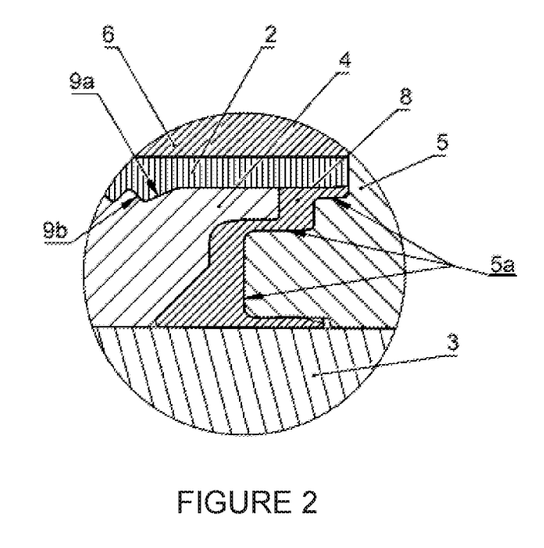
FIG. 2 shows expanded details of the composite pipe termination shown in FIG. 1 from detail view B.

FIG. 2 shows expanded details of the end-fitting shown in FIG. 1 from detail view B in which the extension region of annular portion 2 and collet 4 can be seen. Circumferentially extending ridges 9a on the external surface of the annular portion are shown which mesh with a circumferentially extending groove 9b on the interior collet surface. In addition, the annular collar 3 can be seen enclosing the collet 4. Moreover, on one side of the extension region of the annular portion 2 the first sealing element 8 can be seen and on the other side of the of the extension region of the annular portion 2 the second sealing element 6 can be seen. First sealing element 8, the end of the extension region of annular portion 2 and second sealing element 6 together form part of the sealing interface which sealingly engages with first interface 5a.

Figure 3:
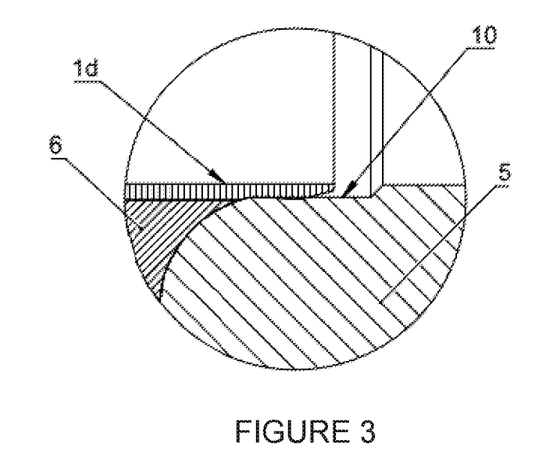
FIG. 3 shows expanded details of the composite pipe termination shown in FIG. 1 taken from detail view C.

FIG. 3 shows expanded details of the end-fitting shown in FIG. 1 taken from detail view C. In this figure, liner 1d is shown to have an extension portion, which is a portion of the liner which extends beyond the pipe end (the pipe end is located on the far left, out of this figure). First interface 5a comprises a receiving portion 10 machined into end-fitting 5 which receives part of the extension portion of liner 1d to form a lip seal. In use, the extension portion of liner 1d is pressed against the receiving portion 10 by the pressure of fluid flowing through the composite pipe termination to enhance the seal.

The invention claimed is:

1. A composite pipe termination comprising:
 a) a composite pipe formed of composite material and having an interior pipe surface, an exterior pipe surface and a pipe end, wherein composite material is a material comprising a polymer matrix and a plurality of reinforcing fibres embedded in the polymer matrix;
 b) a liner, wherein the interior pipe surface is fused to the liner;
 c) an annular portion of composite material having an internal surface attached to the exterior pipe surface and an external surface, wherein the external surface comprises circumferentially extending ridges;
 d) a collet having an interior collet surface, wherein the collet encloses at least a part of the annular portion and wherein the interior collet surface comprises circumferentially extending grooves, and wherein the circumferentially extending ridges on the external surface of the annular portion mesh with the circumferentially extending grooves on the interior collet surface to provide axial movement blocking means which prevent or limit axial movement of the collet relative to the annular portion;
 e) an annular collar which encloses and mates with the collet to prevent the collet from moving axially relative to the annular collar;
 f) an end-fitting;
 g) locking means which lock the end-fitting to the annular collar to prevent the end-fitting from moving axially with respect to the annular collar.

2. The composite pipe termination of claim 1, wherein each circumferentially extending ridge from the circumferentially extending ridges meshes with a respective circumferentially extending groove from the circumferentially extending grooves.

3. The composite pipe termination of claim 1, wherein the collet is divided axially into two or more parts to enable it to be assembled over the circumferentially extending ridges on the external surface of the annular portion.

4. The composite pipe termination of claim 1, wherein the circumferentially extending ridges on the external surface of the annular portion and the circumferentially extending grooves on the interior collet surface have a wave-form which is selected from triangular and sinusoidal.

5. The composite pipe termination of claim 1, wherein the annular portion comprises an extension region which extends beyond the pipe end.

6. The composite pipe termination of claim 1, wherein the liner comprises an extension portion which extends beyond the pipe end.

7. The composite pipe termination of claim 6, wherein a first sealing element provides a seal between the collet, the extension region and the collar and wherein a second sealing element provides a seal between the extension region, the pipe end and the extension portion and wherein the first sealing element, the extension region, the second sealing element and the extension portion together form a sealing interface which sealingly engages with the end fitting.

8. The composite pipe termination of claim 7, wherein the end-fitting comprises:
 a. a first interface which sealingly engages with the sealing interface;
 b. a second interface for sealingly engaging with another apparatus;
 c. an intermediate region which connects the first interface to the second interface,
wherein the intermediate region has a diameter which is smaller than the diameter of the first interface.

9. The composite pipe termination of claim 8, wherein:
 a. the annular collar comprises a locking portion which extends beyond the first interface;
 b. the locking portion comprises an inner surface which is provided with a female thread;
 c. the end-fitting comprises an outer surface which is provided with a male thread;
 d. the male thread on the outer surface of the end-fitting engages with the female thread of the locking portion to lock the end-fitting to the annular collar and prevent the end-fitting from moving axially with respect to the annular collar.

10. The composite pipe termination of claim 8, wherein:
 a. the annular collar comprises a locking portion which extends beyond the first interface, such that the locking portion overlaps part of the intermediate region and is radially spaced therefrom by an annular locking space;
 b. the locking portion comprises an inner surface which is provided with a female thread;
 c. the locking means comprises a locking ring having an external surface provided with a male thread; and
 d. the male thread of the locking ring engages with the female thread of the locking portion to lock the locking ring within the annular locking space and prevent the end-fitting from moving axially with respect to the annular collar.

11. The composite pipe termination of claim 10, wherein the locking ring is made of steel.

12. The composite pipe termination of claim 8, wherein first interface comprises a receiving portion formed to receive part of the extension portion and form a lip seal, wherein, in use, the lip seal is pressed against the receiving portion by the pressure of fluid contained within the pipe termination to enhance the seal.

13. The composite pipe termination of claim 1, wherein the end-fitting, the collet and the collar are made of steel.

14. The composite pipe termination of claim 1, wherein the end-fitting comprises a flange.

15. The composite pipe termination of claim 1, wherein the composite pipe comprises wound tapes of composite material which have been fused together and wherein the polymer matrix consists of thermoplastic polymer.

16. The composite pipe termination of claim 15, wherein the reinforcing fibres are continuous along the entire length of the tapes.

17. The composite pipe termination of claim 1, wherein the annular portion consists of a composite material which is the same as the composite material of which the composite pipe consists.

18. A method of providing a composite pipe termination, the method comprising:
   a) providing a composite pipe formed of composite material and having an interior pipe surface, an exterior pipe surface and a pipe end, wherein composite material is a material comprising a polymer matrix and a plurality of reinforcing fibres embedded in the polymer matrix; and wherein the interior pipe surface is fused to a liner;
   b) attaching an annular portion of composite material to the exterior pipe surface, wherein the annular portion has an external surface;
   c) providing the external surface of the annular portion with circumferentially extending ridges;
   d) providing a collet having an interior collet surface, wherein the interior collet surface comprises circumferentially extending grooves and wherein the collet is divided axially into two or more parts to enable it to be assembled over the circumferentially extending ridges on the external surface of the annular portion;
   e) assembling the collet to enclose at least a portion of the annular portion, such that the circumferentially extending ridges on the external surface of the annular portion mesh with the circumferentially extending grooves on the interior collet surface to provide axial movement blocking means which prevent or limit axial movement of the collet relative to the annular portion;
   f) providing: i. an annular collar configured to enclose and mate with the collet; ii. an end-fitting; iii. locking means which lock the end-fitting to the annular collar;
   g) arranging the annular collar to enclose and mate with the collet to prevent the collet from moving axially relative to the annular collar and locking the end-fitting to the annular collar with the locking means in order to prevent the end-fitting from moving axially with respect to the annular collar.

19. The method of claim 18, wherein the attaching an annular portion of composite material to the exterior pipe surface comprises winding tapes of composite material onto the exterior pipe surface to create the annular portion.

20. The method of claim 18, wherein the providing the external surface of the annular portion with circumferentially extending ridges comprises removing a portion of the wound tapes to provide the circumferentially extending ridges.

* * * * *